United States Patent
Li et al.

(10) Patent No.: US 10,550,490 B2
(45) Date of Patent: Feb. 4, 2020

(54) TRANSPARENT CONDUCTIVE FILMS WITH EMBEDDED METAL GRIDS

(71) Applicant: Versitech Limited, Hong Kong (CN)

(72) Inventors: Wendi Li, Hong Kong (CN); Arshad Khan, K.P.K. (PK)

(73) Assignee: Versitech Limited, Hong Kong (CN)

( * ) Notice: Subject to any disclaimer, the term of this patent is extended or adjusted under 35 U.S.C. 154(b) by 0 days.

(21) Appl. No.: 15/097,919

(22) Filed: Apr. 13, 2016

(65) Prior Publication Data

US 2016/0345430 A1    Nov. 24, 2016

Related U.S. Application Data

(60) Provisional application No. 62/165,566, filed on May 22, 2015.

(51) Int. Cl.
| | |
|---|---|
| *B32B 3/00* | (2006.01) |
| *C25D 5/54* | (2006.01) |
| *C25D 5/02* | (2006.01) |
| *C25D 5/48* | (2006.01) |
| *C25D 1/04* | (2006.01) |
| *C25D 1/08* | (2006.01) |

(52) U.S. Cl.
CPC .............. *C25D 5/54* (2013.01); *C25D 1/04* (2013.01); *C25D 1/08* (2013.01); *C25D 5/022* (2013.01); *C25D 5/48* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| 6,153,901 A | 11/2000 | Higashi |
| 8,912,086 B2 | 12/2014 | Jo et al. |
| 2006/0185983 A1 | 8/2006 | Kumai et al. |
| 2007/0279939 A1* | 12/2007 | Hirata ................ H01J 11/12 362/616 |

(Continued)

FOREIGN PATENT DOCUMENTS

| CN | 101123852 A | 2/2008 |
| CN | 102222538 A | 10/2011 |

(Continued)

OTHER PUBLICATIONS

Hiemenz, P.C., "Polymer Chemistry the Basic Concepts", 1984, Marcel Dekker, Inc., pp. 262-263.*

(Continued)

*Primary Examiner* — Seth Dumbris
(74) *Attorney, Agent, or Firm* — Saliwanchik, Lloyd & Eisenschenk (57) ABSTRACT

A transparent conductive film with a metal mesh embedded in a substrate and a method of fabrication thereof is provided. The metal mesh has a cap that is pressed and embedded in a substrate or a deformable material on a substrate, providing superior mechanical stability by mechanical interlocking. The embedding mechanism also provides superior chemical and environmental stability. A fabrication method is provided and includes a vacuum-free and low-cost process for large-volume manufacturing of the transparent conductive film with tunable performance.

15 Claims, 14 Drawing Sheets

(56) References Cited

U.S. PATENT DOCUMENTS

| | | | |
|---|---|---|---|
| 2009/0183901 A1 | 7/2009 | Kataoka et al. | |
| 2009/0221111 A1* | 9/2009 | Frolov | H01L 31/02243 |
| | | | 438/65 |
| 2012/0097424 A1* | 4/2012 | Jo | G02F 1/13439 |
| | | | 174/126.4 |
| 2014/0261654 A1 | 9/2014 | Babayan et al. | |
| 2014/0360757 A1 | 12/2014 | Gao et al. | |

FOREIGN PATENT DOCUMENTS

| | | | |
|---|---|---|---|
| CN | 104571676 A | 4/2015 | |
| CN | 204257226 U | 4/2015 | |
| JP | 2003105070 * | 4/2003 | C08G 61/06 |
| KR | 10-2008-0014623 A | 2/2008 | |
| KR | 10-1051448 B1 | 7/2011 | |

OTHER PUBLICATIONS

International Search Report dated Jul. 28, 2016 in International Application No. PCT/CN2016/081100.
Office Action dated Oct. 12, 2019 in Chinese Application No. 201680029448.3.

* cited by examiner

TRANSPARENT CONDUCTIVE FILMS WITH EMBEDDED METAL GRIDS

CROSS-REFERENCE TO RELATED APPLICATION

This application claims the benefit of U.S. provisional application Ser. No. 62/165,566, filed May 22, 2015, which is herein incorporated by reference in its entirety.

BACKGROUND OF THE INVENTION

The present invention relates to the field of transparent conductive electrodes (TCEs) and films. Conventional materials for TCEs include thin films of transparent oxides (TCOs), which have reasonable electronic performance. However, for many industrial applications, conventional materials have problems such as film brittleness, low infrared transmittance, and low abundance, limiting their suitability for many applications. To overcome these limitations, several new generation TCEs based on graphene, carbon nanotubes, metal nanowire networks, and metal mesh are proposed.

Silver nanowire based TCEs are often used in touch screen products. Graphene and carbon nanotube based TCEs are being studied in research labs, but have yet to reach the stage of being fully commercialized. Metal mesh or metal grid TCEs are promising alternatives that can offer superior performance compared to traditional oxide based TCEs and silver nanowire based TCEs. However, their high manufacturing cost and complicated manufacturing process have hindered the development and application of metal grid TCEs.

BRIEF SUMMARY OF THE INVENTION

Embodiments of the present invention pertain to novel metal mesh based flexible transparent conductive film structures with a metal mesh embedded in a substrate and methods of fabrication thereof. The metal mesh may have a cap that is pressed and embedded in a substrate or a deformable material on a substrate. Therefore, when the substrate is bent, the cap helps anchor the metal mesh in the substrate, keeping the metal mesh securely fastened and helping to improve its mechanical strength and stability. In one embodiment, the surface of the metal mesh is flush with the substrate surface. The resulting transparent conductive electrode (TCE) may then have a smooth surface, which is important for device integration.

According to another embodiment of the present invention, a cost-effective approach for fabricating a metal mesh TCE involving lithography, electroplating, and thermal imprint transfer is also provided. Such fabrication methods allow for large-volume production of TCEs at a low cost.

DETAILED DISCLOSURE OF THE INVENTION

The subject invention provides novel and advantageous transparent conductive electrode structures and methods of fabricating the same. According to an embodiment of the present invention, a transparent conductive film includes a transparent substrate, a metal mesh that is embedded in the transparent substrate, and the metal mesh may have a cap that is embedded in the transparent substrate. The transparent substrate may be a flexible plastic film and the cap of the metal mesh can take the shape of a curved button or another irregular shape. In an embodiment, the metal mesh has an exposed side, which is not covered by the transparent substrate, and the metal mesh may be flush with the surface of the transparent substrate. In another embodiment, rather than being on one end of the lines of the metal mesh, the cap may be between the ends of the metal lines (e.g., a cap with metal lines extending from both sides).

According to another embodiment of the present invention, a transparent conductive film includes a transparent substrate and a metal mesh that is embedded in the transparent substrate. The metal mesh may have an exposed surface and a linewidth of the mesh may decrease going towards the exposed surface or increase going towards the exposed surface.

According to yet another embodiment of the present invention, a method for fabricating a transparent conductive electrode includes preparing a first substrate, preparing a layer of dissolvable resist on the first substrate, creating a grid pattern in the resist layer by a lithography method, forming a trench grid network and exposing the first substrate through the trench, placing the first substrate in an electroplating bath and conducting electrodeposition of a metal into the grid pattern, ceasing electrodeposition when the metal reaches a sufficient thickness or is overplated out of the trench, dissolving the resist layer, covering the first substrate with a second substrate having a deformable surface layer, and pressing the metal grid on the first substrate into the second substrate and then solidifying the second substrate. This embodiment may further include pealing the second substrate with the metal mesh from the first substrate.

Figure 1A:
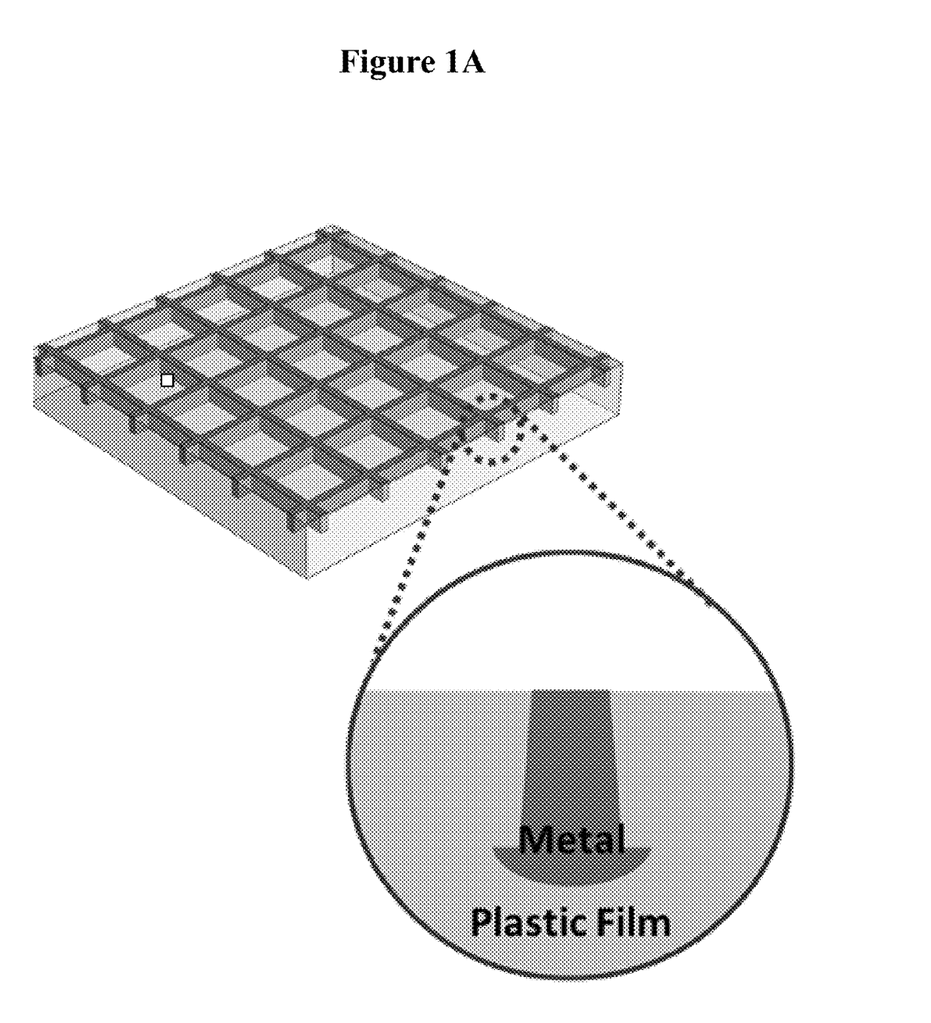
FIG. 1A shows a structure of an embedded metal grid transparent conductive electrode (TCE) according to an embodiment of the present invention.
Figure 1B:
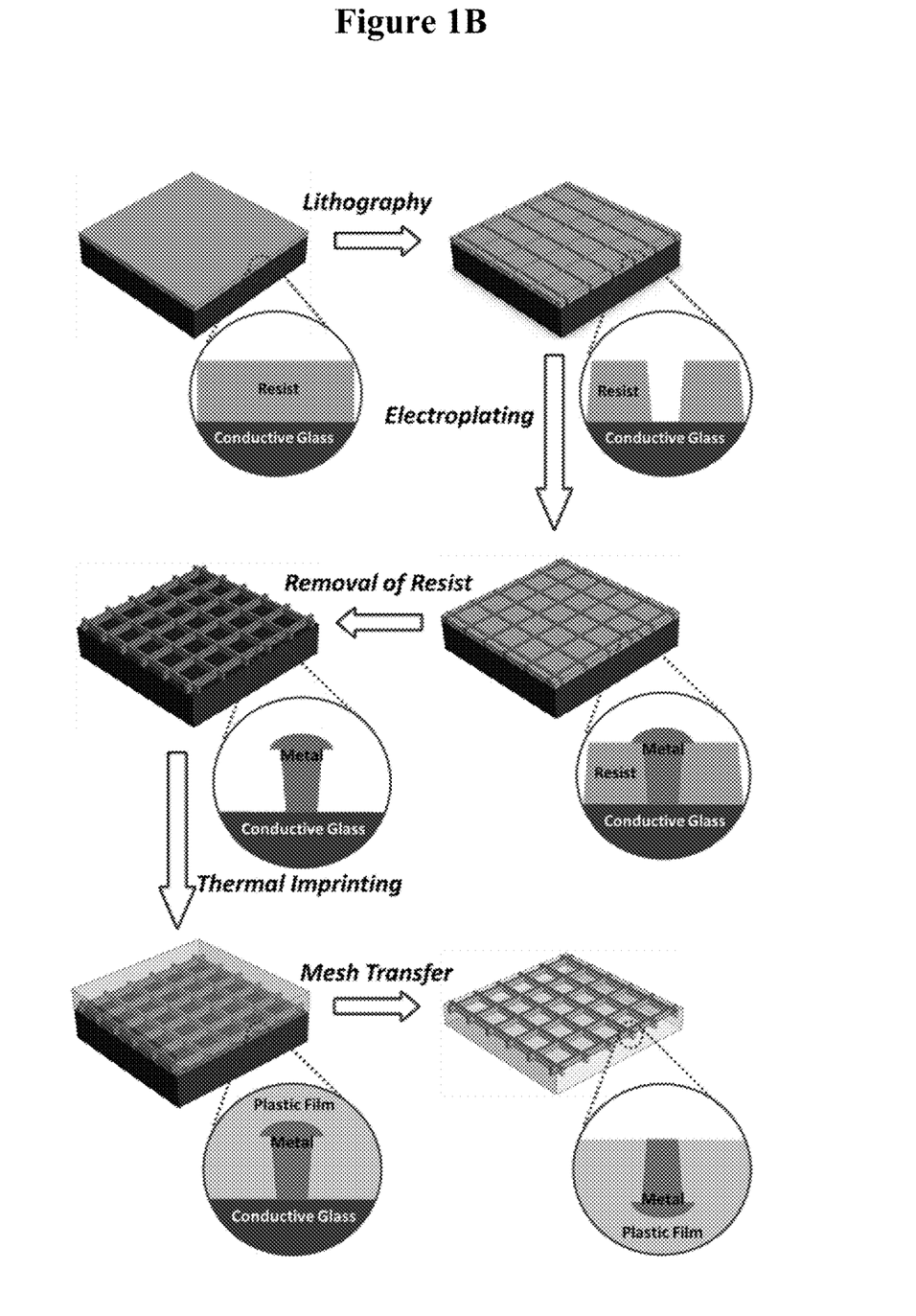
FIG. 1B shows a fabrication method for an embedded metal grid transparent conductive electrode according to an embodiment of the present invention.

A transparent conductive electrode (TCE) structure according to an embodiment of the present invention is shown in FIG. 1A. A metal mesh with line-spacing between 1 μm and 100 μm and linewidths between 100 nm and 10 μm is pressed into a plastic substrate or a plastic layer on a rigid substrate. A bottom side of the metal mesh has a cap that is wider than the linewidth of the top part of the metal mesh (either the top part of the metal line or the base of the metal line where the cap begins). This cap works as an anchor to fix the metal grid in the plastic layer during bending. For example, the metal cap can have a width that is 1.1 to 3 times the linewidth of the metal mesh as measured at the exposed surface or at the base of the cap. More specifically, the cap can have a width that is 1.2 to 1.5 times the linewidth of the metal mesh. The metal cap may have a height that is 0.1 to 1.0 times the height of the metal mesh. The height of the metal mesh can be in a range from 100 nm to 10 and can be much higher than the linewidth, therefore providing for improved conductivity while not affecting the optical transmission significantly. The lines of the metal mesh can taper going from the bottom to top as shown in FIG. 1, or can taper going from top to bottom (not shown). In addition, the caps (i.e., anchors) can have different shapes than the rounded button-like shape presented in FIG. 1.

A metal mesh TCE according to an embodiment of the present invention can be fabricated in a cost-effective solution-processed manner that includes steps of lithography, electroplating, resist removal, and thermal imprinting and mesh transfer. A schematic of an approach for fabricating a metal mesh TCE according to an embodiment of the present invention can be seen in FIG. 1B. According to FIG. 1B, a method for fabricating a transparent flexible copper metal grid electrode according to an embodiment of the present invention includes five steps: (i) mesh pattern formation in the spin-coated polymer resist on fluorine-doped tin oxide (FTO) glass by lithography; (ii) deposition of copper by electroplating inside trenches to form a uniform Cu mesh; (iii) etching the resist to get the bare Cu mesh on a glass substrate; (iv) pushing the bare Cu mesh into the polymer film by a thermal imprinting process; and (v) separation of both substrates to transfer Cu mesh to a flexible polymer substrate in an embedded form.

Figure 2A:
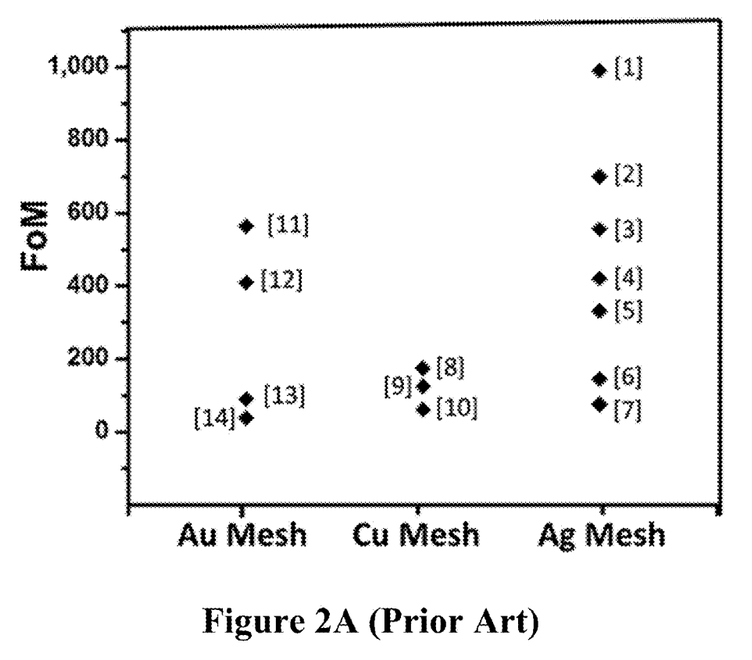
FIG. 2A is a Figure of Merit (FoM) graph of metal grid TCEs of the prior art.
Figure 2B:
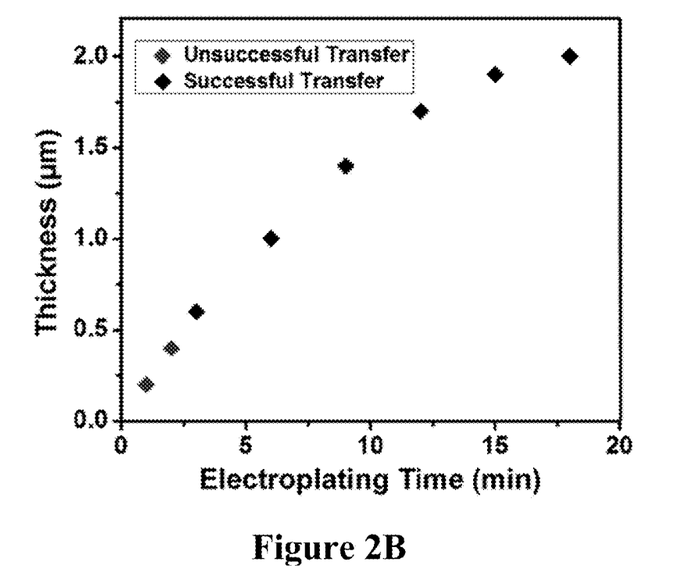
FIG. 2B is a graph relating the thickness of the metal grid versus electroplating time, according to an embodiment of the present invention.

FIG. 2A is a Figure of Merit (FoM) graph of metal grid TCEs of the prior art. The prototype copper grid TCEs fabricated using above procedures are characterized with respect to various properties as illustrated in FIGS. 2B-2H. Since the thickness of the metal grid can be tuned by changing the electroplating time as shown in FIG. 2B, the performance, particularly the sheet resistance, can be tailored according the application requirements of different devices.

Figure 2C:
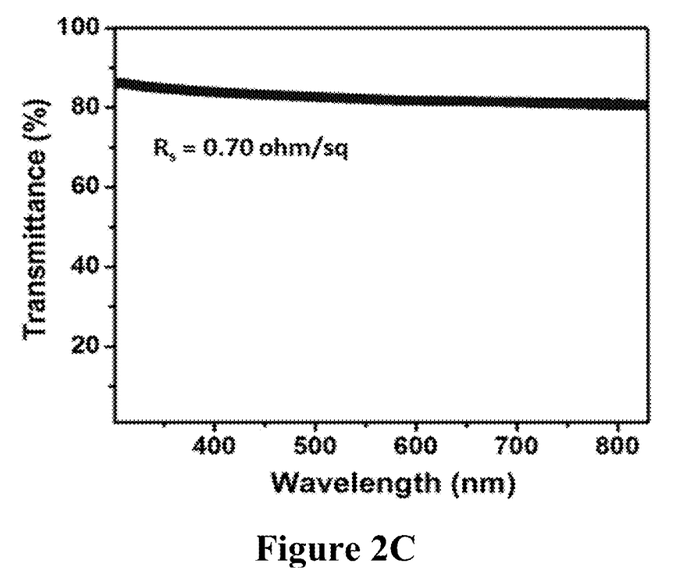
FIG. 2C is a graph of optical transmittance measurements of a copper grid TCE according to an embodiment of the present invention.
Figure 2D:
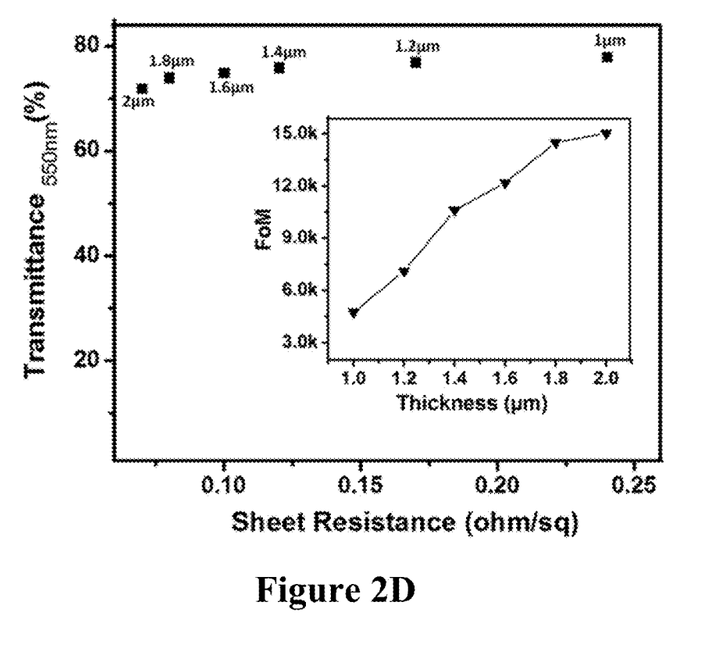
FIG. 2D is an FoM graph of TCEs fabricated with different grid thickness by controlling electroplating time, according to an embodiment of the present invention.

Copper grid TCEs according to an embodiment of the present invention can have figures of merit values more than one order of magnitude higher than those of the prior art, as shown in FIG. 2A and FIG. 2D. The transmittance of a copper grid TCE according to an embodiment of the present invention is shown in FIG. 2C. FIG. 2D is an FoM graph of TCEs fabricated with different grid thicknesses by controlling electroplating time, according to an embodiment of the present invention.

Figure 2E:
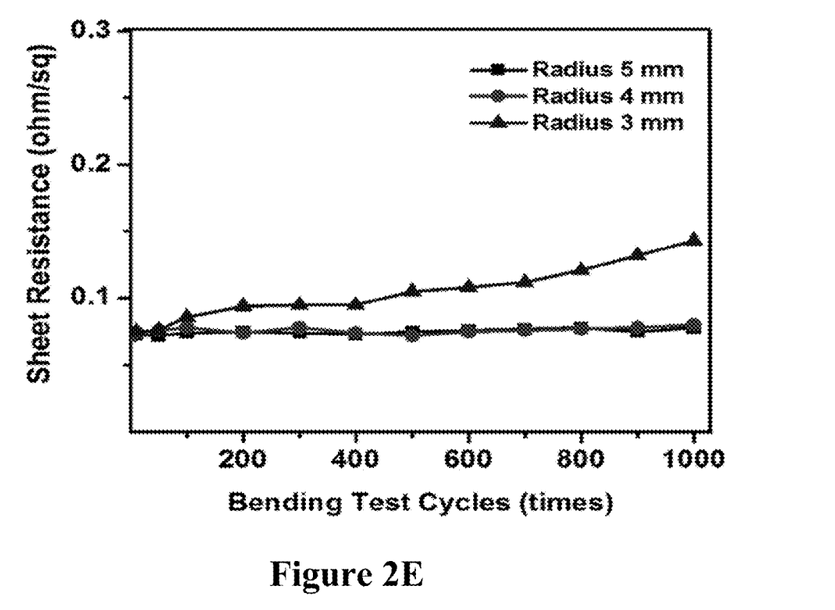
FIG. 2E is a graph showing resistance change of copper grid TCEs under multiple cycles of compressive bending, according to an embodiment of the present invention.
Figure 2F:
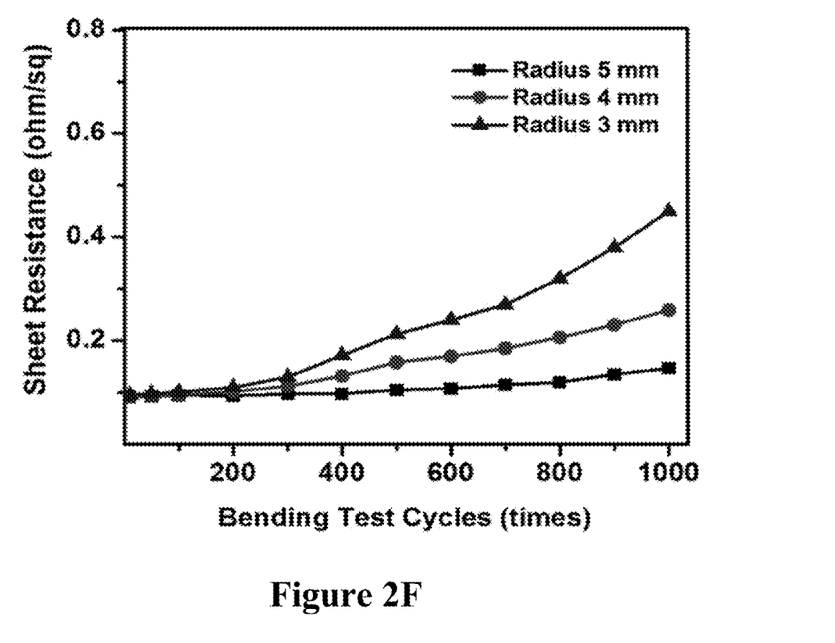
FIG. 2F is a graph showing resistance change of the copper grid TCEs under multiple cycles of tensile bending, according to an embodiment of the present invention.
Figure 2G:
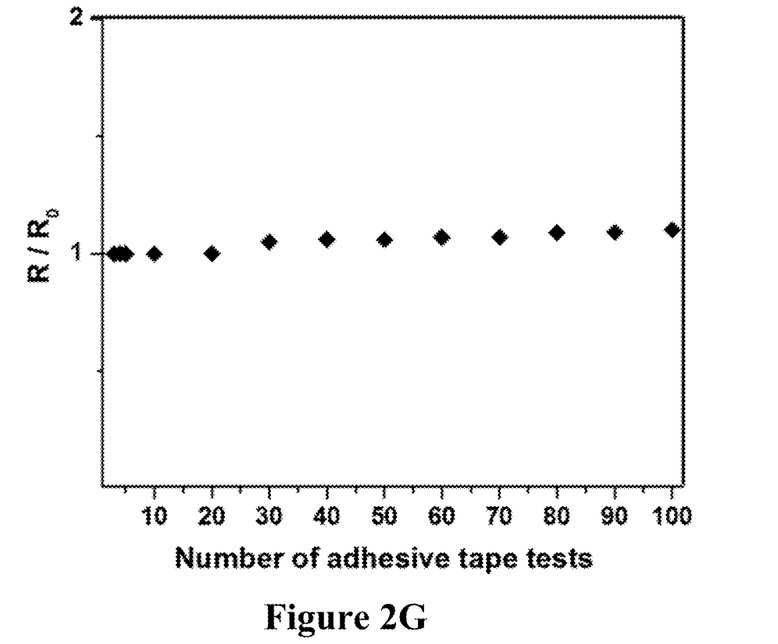
FIG. 2G is a graph illustrating adhesive peeling tape test results of the TCE, according to an embodiment of the present invention.
Figure 2H:
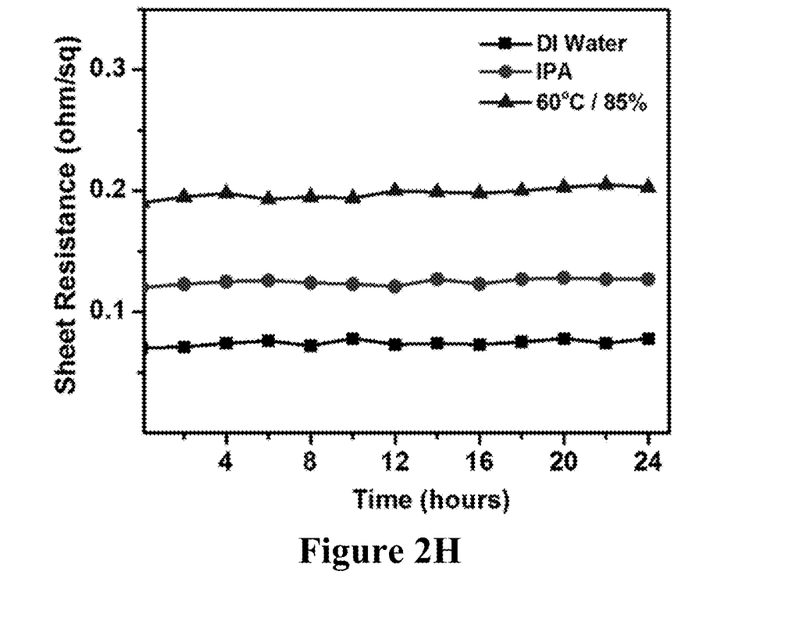
FIG. 2H is a graph illustrating the stability of TCEs under different chemical and environmental tests, according to an embodiment of the present invention.

Superior bending test results are also observed with the TCEs according to an embodiment of the present invention. For example, after 1000 repetitions of compressive bending with a radius as small as 3 mm, the resistance increase observed was less than 0.1 ohm/sq, as shown in FIG. 2E, for a copper grid TCE with an initial sheet resistance of about 0.075 ohm/sq. As for tensile bending, after 1000 cycles, the sheet resistance of a copper grid TCE changed from 0.1 ohm/sq to less than 0.5 ohm/sq at a radius of 3 mm. FIG. 2F is a graph showing resistance change of the copper grid TCEs according to embodiments of the present invention under multiple cycles of tensile bending. The TCEs according to an embodiment of the present invention also demonstrated superior peeling test results as shown in FIG. 2G, as well as excellent chemical resistance and superior stability in harsh environments, as shown in FIG. 2H. These advantageous properties of TCEs according to embodiments of the present invention are mainly due to the embedded structure. It is the embedded structure that helps protect the metal grid from the surrounding environment, therefore improving environmental and chemical stability. In addition, the anchoring cap of the metal helps to improve mechanical stability.

Figure 3:
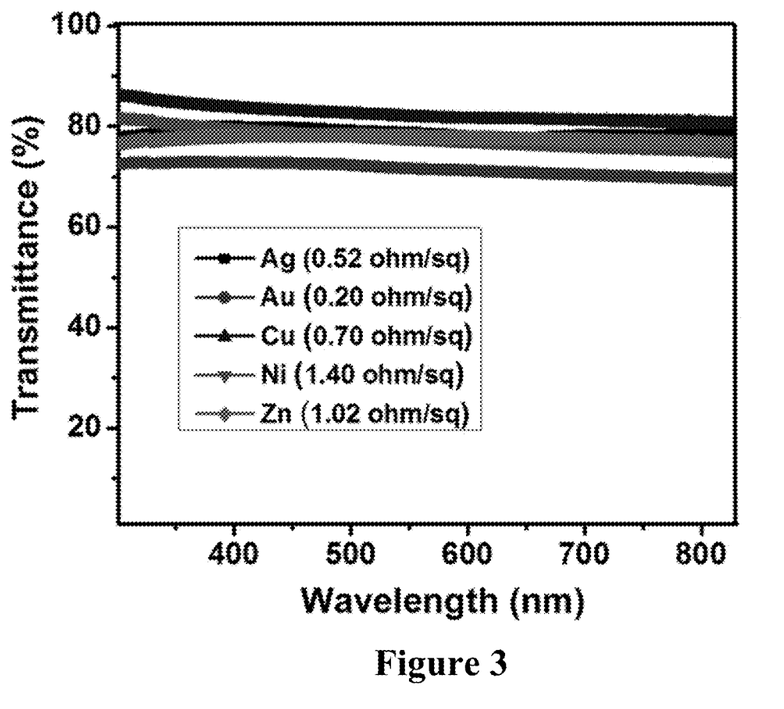
FIG. 3 is a graph of wavelength versus transmittance of different metal grids according to embodiments of the present invention.

Moreover, the fabrication methods of the present invention can be applied to many different metals such as silver, gold, nickel, and zinc, in addition to copper, as shown in FIG. 3. Such versatility in material selection provides a significant advantage in tuning the work function of the grid for improving the performance of different devices. FIG. 3 shows the transmittance of multiple prototype TCEs fabricated using different metals.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 4A:
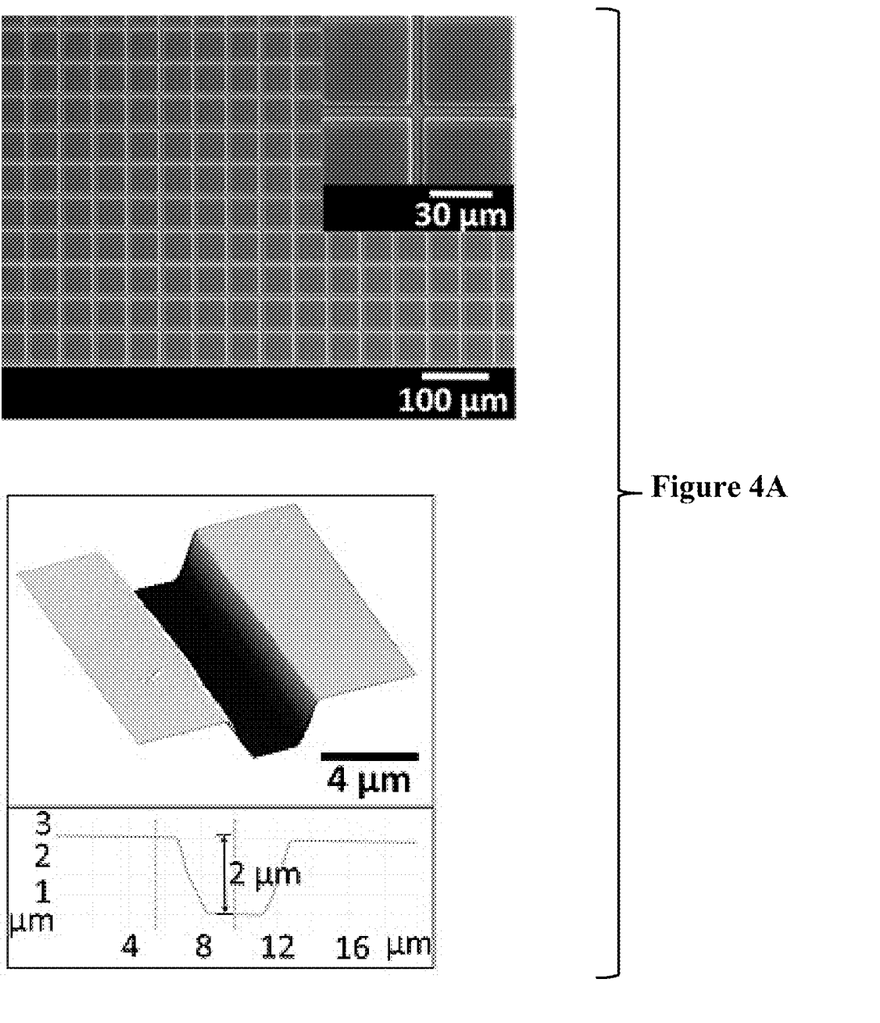
FIG. 4A shows a grid pattern in a resist after a lithography step according to the present invention.
Figure 4B:
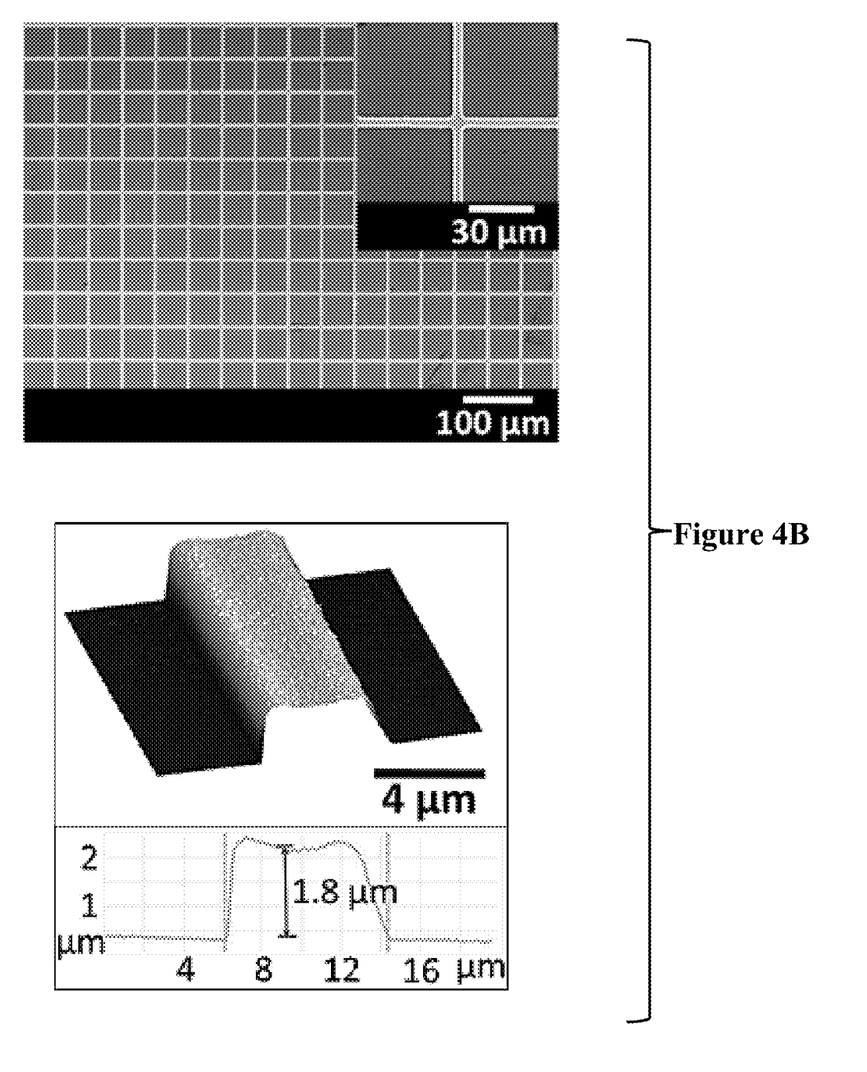
FIG. 4B shows a copper grid on a conductive substrate after electroplating and resist removal steps according to an embodiment of the present invention.
Figure 4C:
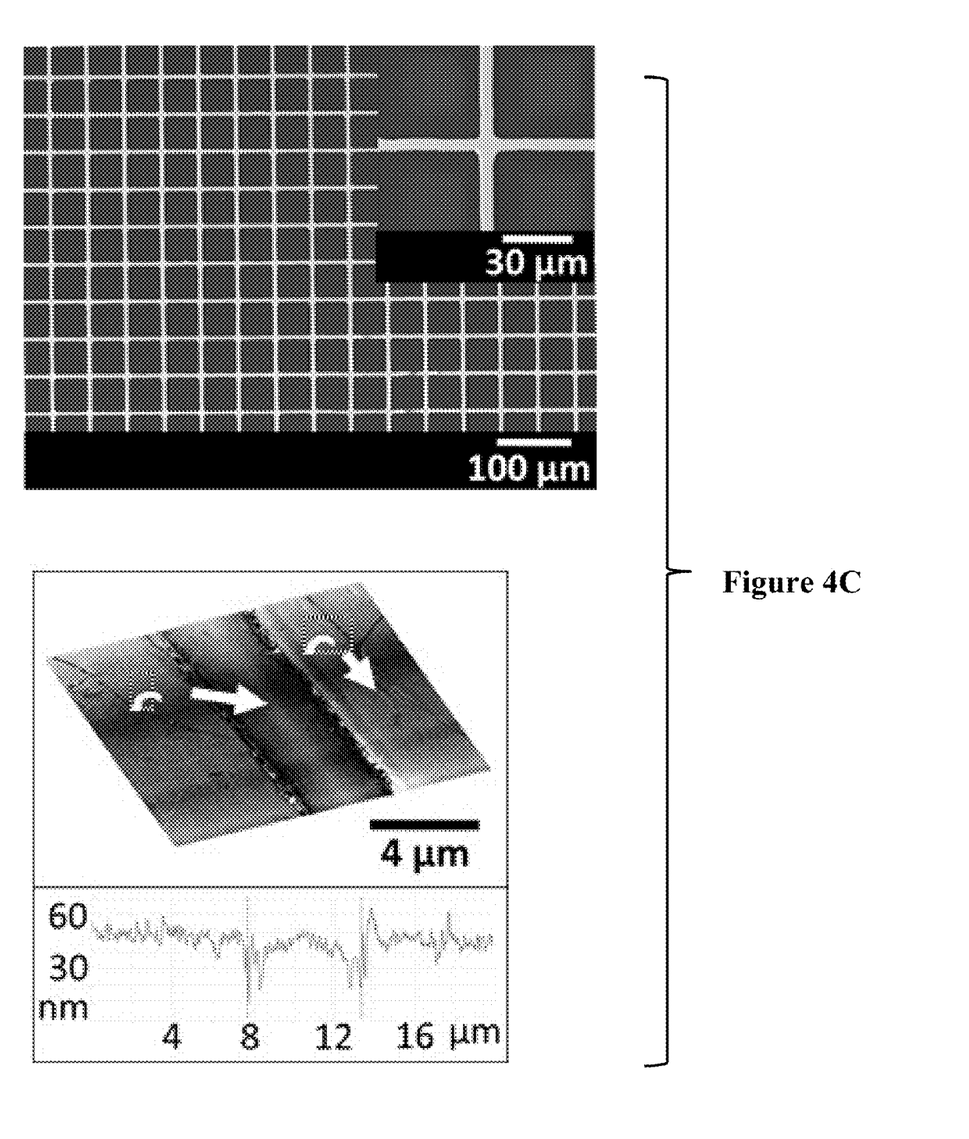
FIG. 4C shows a final copper grid TCE a the copper grid transferred and embedded in a plastic film to form a flexible transparent electrode according to an embodiment of the present invention.

An embodiment of the present invention was fabricated as seen in FIGS. 4A-C. In the TCE structure embodiment of FIGS. 4A-C, a Cu mesh TCE was fabricated using the above stated fabrication procedure with photolithography being used to pattern the resist. FIG. 4A shows a grid pattern in the resist after the resist was first exposed during photolithography using a grid pattern and then developed. SEM and AFM characterizations show that the lithography patterned resist had a linewidth of about 4 microns and a depth of about 2 microns. The openings in the grid were about 50 microns. After electroplating copper into the grid trenches and removing the resist, the copper grid was obtained on a conductive substrate, such as an FTO glass substrate, as shown in FIG. 4B. Then, a thermoplastic film such as a cyclic olefin copolymer film was placed on the metal grid, heated, and then pressed. That is, the metal grid was pressed into the softened plastic film. After cooling and peeling off the plastic film from the FTO glass substrate, the metal grid was thereby transferred to the plastic film. As a result, a flexible transparent conductive film with an embedded copper grid was fabricated. FIG. 4C shows the final copper grid TCE with the copper grid transferred and embedded in a plastic film to form a flexible transparent electrode according to an embodiment of the present invention. In place of copper, other materials such as gold, silver, nickel, zinc, tin, or an alloy of any of these metals (including copper) could have been applied.

Example 2

Figure 5A:
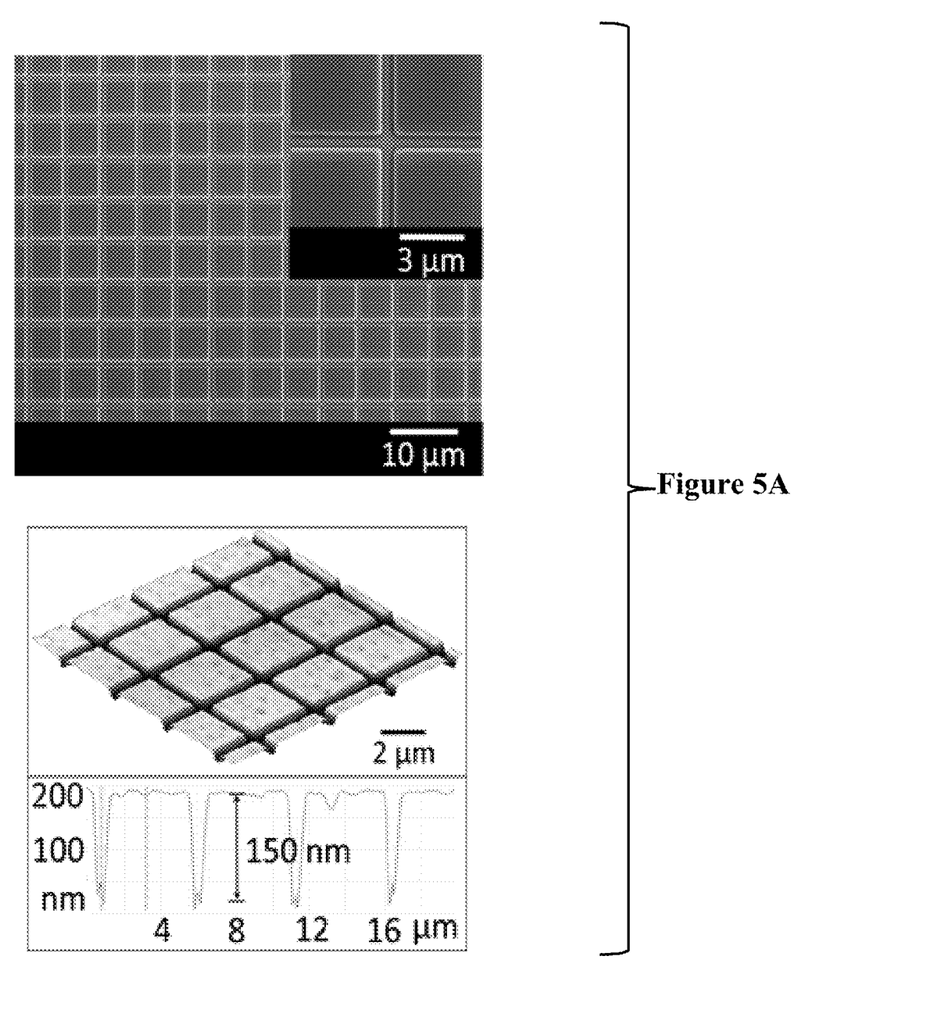
FIG. 5A shows a grid pattern in a resist after a lithography step according to the present invention.
Figure 5B:
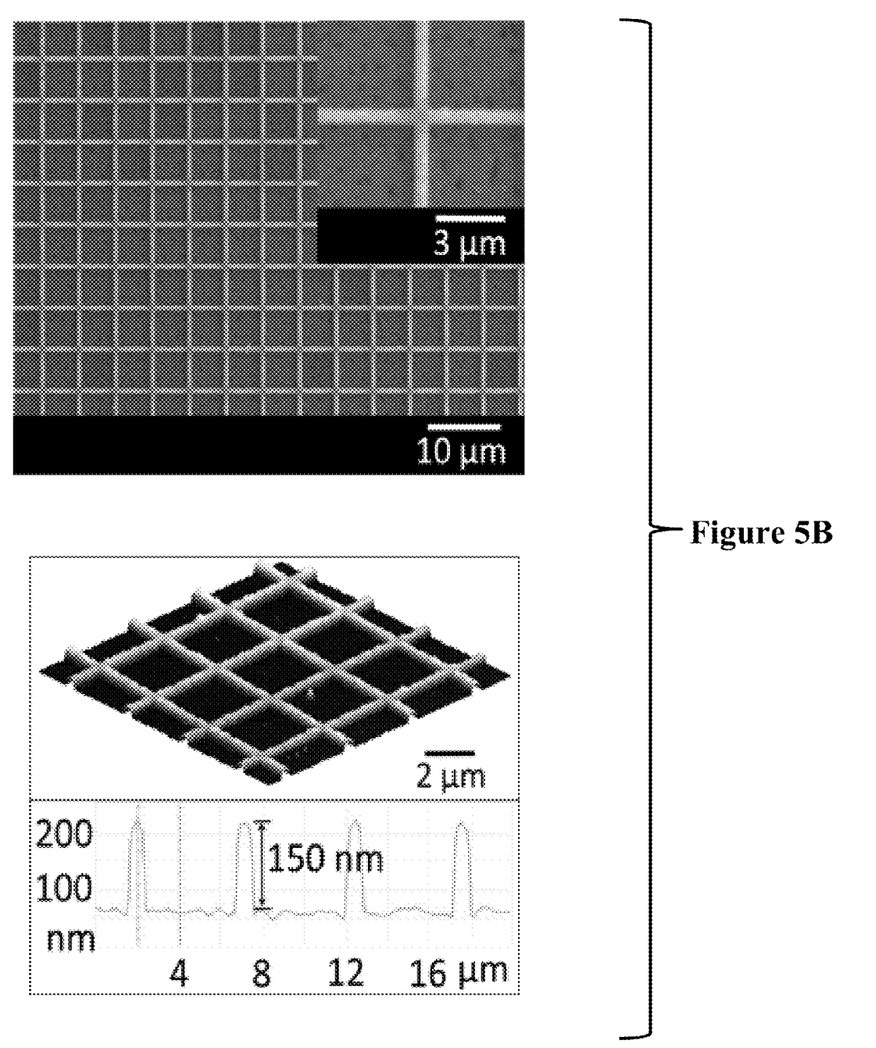
FIG. 5B shows a copper grid on a conductive substrate after electroplating and resist removal steps.
Figure 5C:
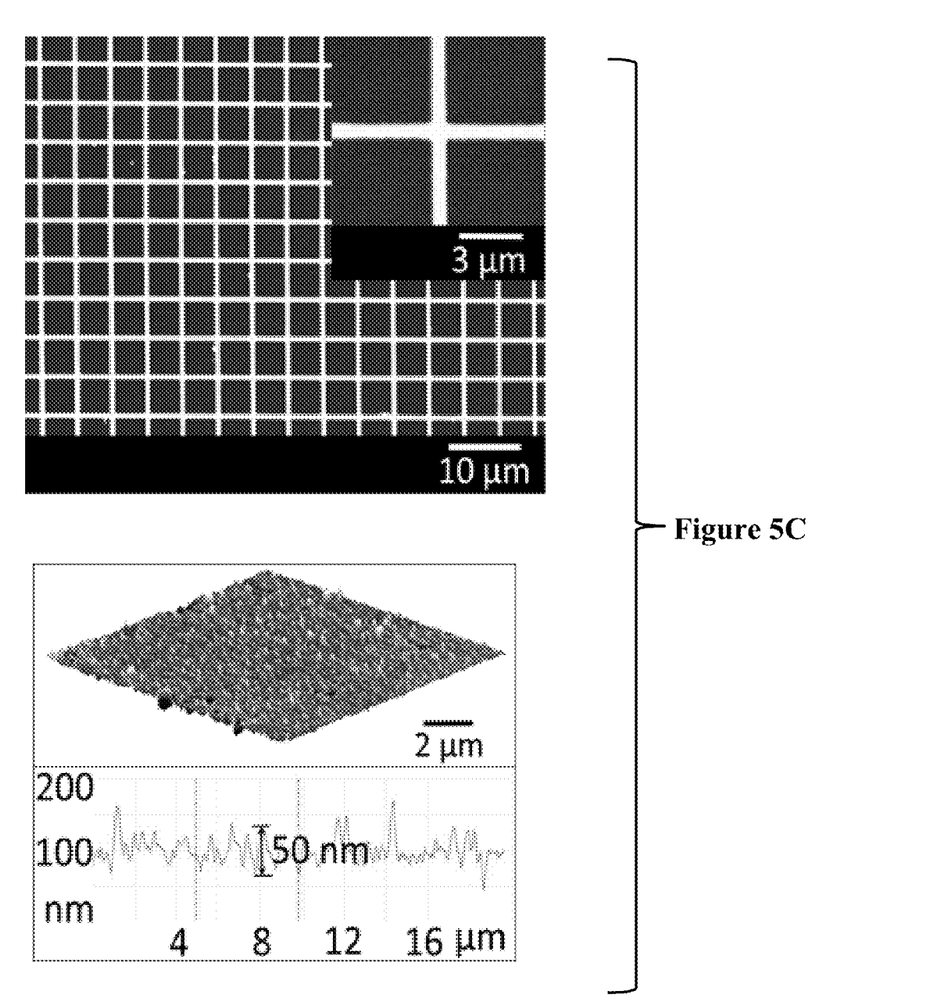
FIG. 5C shows a final copper grid TCE with a copper grid transferred and embedded in a plastic film to form a flexible transparent electrode according to an embodiment of the present invention.

A fabrication method according to an embodiment of the present invention was used to form a sub-micron metal grid as shown in FIGS. 5A-5C, where a copper metal grid with 0.8 micron linewidths and 10 micron openings was fabricated. FIGS. 5A, 5B and 5C each illustrates the SEM and AFM results during this fabrication at different stages. Specifically, FIG. 5A shows the grid pattern in the resist after the lithography step, FIG. 5B shows the copper grid on the conductive substrate after electroplating and resist removal steps, and FIG. 5C shows the final copper grid TCE with the copper grid transferred and embedded in a plastic film to form a flexible transparent electrode.

Example 3

Figure 6:
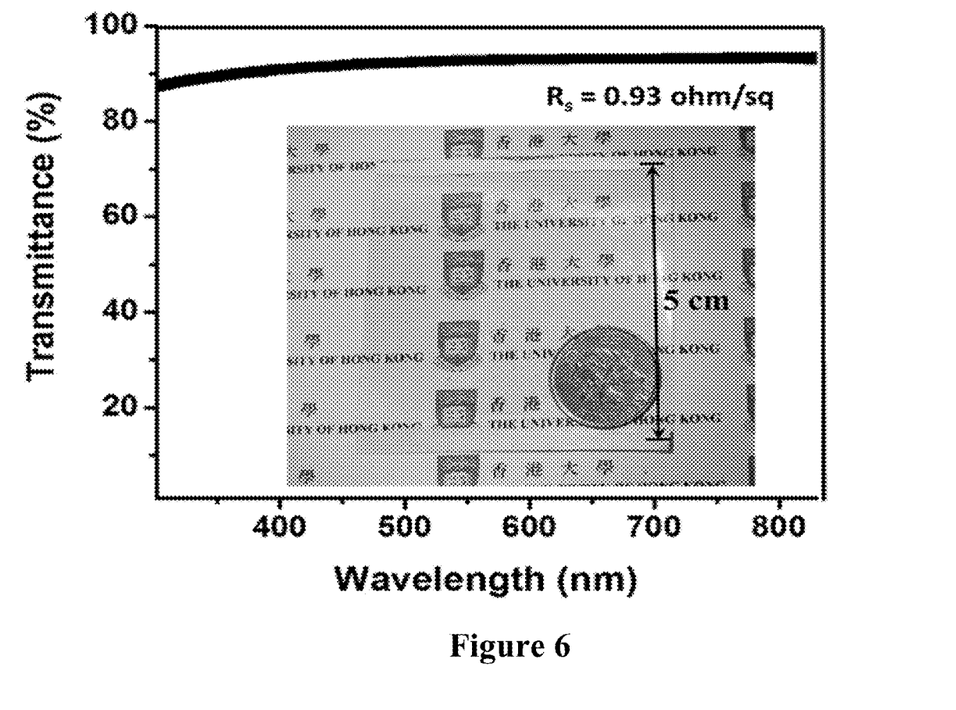
FIG. 6 is an image of a large-area (5 cm×5 cm) copper grid TCE according to an embodiment of the present invention.

In order to incorporate a metal grid TCE into device applications, a large-area TCE according to an embodiment of the present invention was fabricated, as seen in FIG. 6. The TCE of FIG. 6 had a large-area (5 cm×5 cm) copper grid TCE with >90% transmittance and 0.93 ohm/sq sheet resistance. A large-area TCE with a size of 5 cm by 5 cm is sufficient for lighting devices, display devices, and touch-screen devices. Large sizes are achievable by: 1) fabricating small metal grids on conductive substrates (such as FTO glass) and then stitching them together to form a large plastic substrate by a step and repeat pressing process; or 2) using a large-area conductive substrate to directly fabricate a large-area metal grid TCE.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated to be within the scope of the invention without limitation thereto.

All patents, patent applications, provisional applications, and publications referred to or cited herein are incorporated by reference in their entirety, including all figures and tables, to the extent they are not inconsistent with the explicit teachings of this specification.

What is claimed is:
1. A transparent conductive film, comprising:
a transparent substrate; and
a metal mesh comprising a plurality of metal lines embedded in the transparent substrate,
wherein the metal mesh has a cap embedded in the substrate, the cap being disposed between two metal lines, of the plurality of metal lines, respectively extending away from the cap,
wherein the cap has a linewidth that is 1.2 to 1.5 times greater than the linewidth of each of the two metal lines extending away from the cap,
wherein a side surface of the metal mesh is entirely embedded in the transparent substrate such that the side surface of the metal mesh is not exposed, and
wherein the transparent substrate is a thermoplastic film such that the metal mesh is pressed into the transparent substrate when heated.

2. The transparent conductive film according to claim 1, wherein the transparent substrate is a flexible plastic film.

3. The transparent conductive film according to claim 1, further comprising a rigid glass panel on which the transparent substrate is disposed.

4. The transparent conductive film according to claim 2, wherein a surface of the cap has a rounded shape.

5. The transparent conductive film according to claim 1, wherein the transparent substrate is a cyclic olefin copolymer film.

6. The transparent conductive film according to claim 1, wherein the transparent substrate is an ultraviolet light curable material.

7. The transparent conductive film according to claim 1, wherein the metal grid lines have a linewidth between 100 nm and 5000 nm, a grid opening size between 1 μm and 100 μm, and the ratio between the grid opening and the linewidth is between 5 and 100.

8. The transparent conductive film according to claim 1, wherein the metal mesh is tapered in a direction that is opposite the cap.

9. The transparent conductive film according to claim 1, wherein a linewidth of the metal grid gradually increases going away from the cap in one direction.

10. The transparent conductive film according to claim 1, wherein a side of the metal grid is flush with the transparent substrate.

11. The transparent conductive film according to claim 1, wherein a height of the metal grid is from 0.3 to 3 times its linewidth.

12. The transparent conductive film according to claim 1, wherein the metal grid is made of one of copper, gold, silver, nickel, zinc, tin, and alloy of any of these metals.

13. A transparent conductive film, comprising:
a transparent substrate; and
a metal mesh that is embedded in the transparent substrate, the metal mesh comprising a plurality of metal lines,
wherein the metal mesh has a portion that is suitable for anchoring the metal mesh in the substrate,
wherein the portion of the metal mesh is disposed between two metal lines, of the plurality of metal lines, respectively extending away from the portion,
wherein the portion of the metal mesh has a linewidth that is 1.2 to 1.5 times greater than the linewidth of each of the two metal lines extending away from the portion,
wherein a side surface of the metal mesh is entirely embedded in the transparent substrate such that the side surface of the metal mesh is not exposed, and
wherein the transparent substrate is a thermoplastic film such that the metal mesh is pressed into the transparent substrate when heated.

14. The transparent conductive film of claim 13, wherein the metal mesh has an exposed top surface.

15. The transparent conductive film of claim 14, wherein a linewidth of the mesh decreases going towards the exposed top surface.

* * * * *